Patented Aug. 6, 1929.

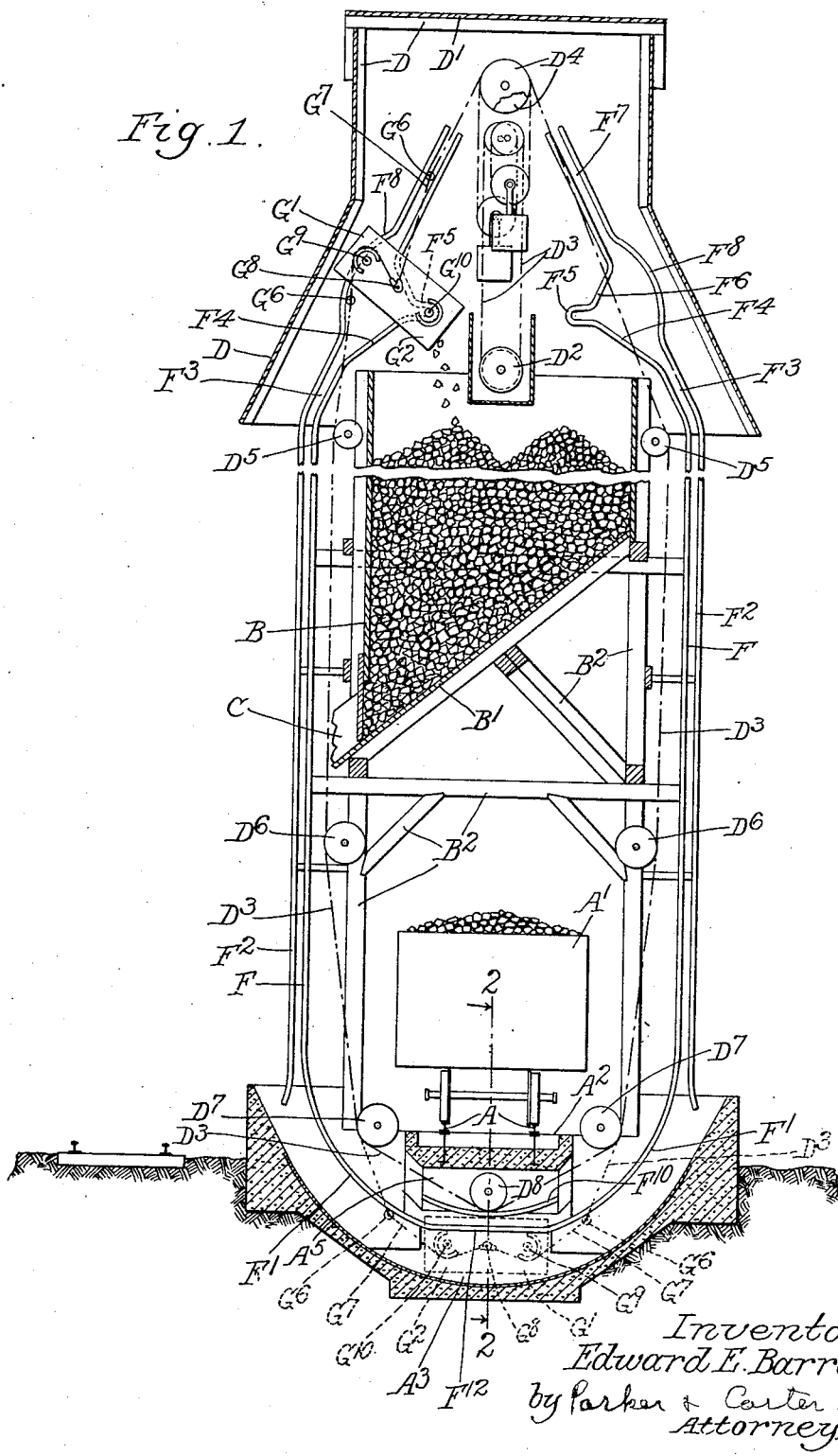

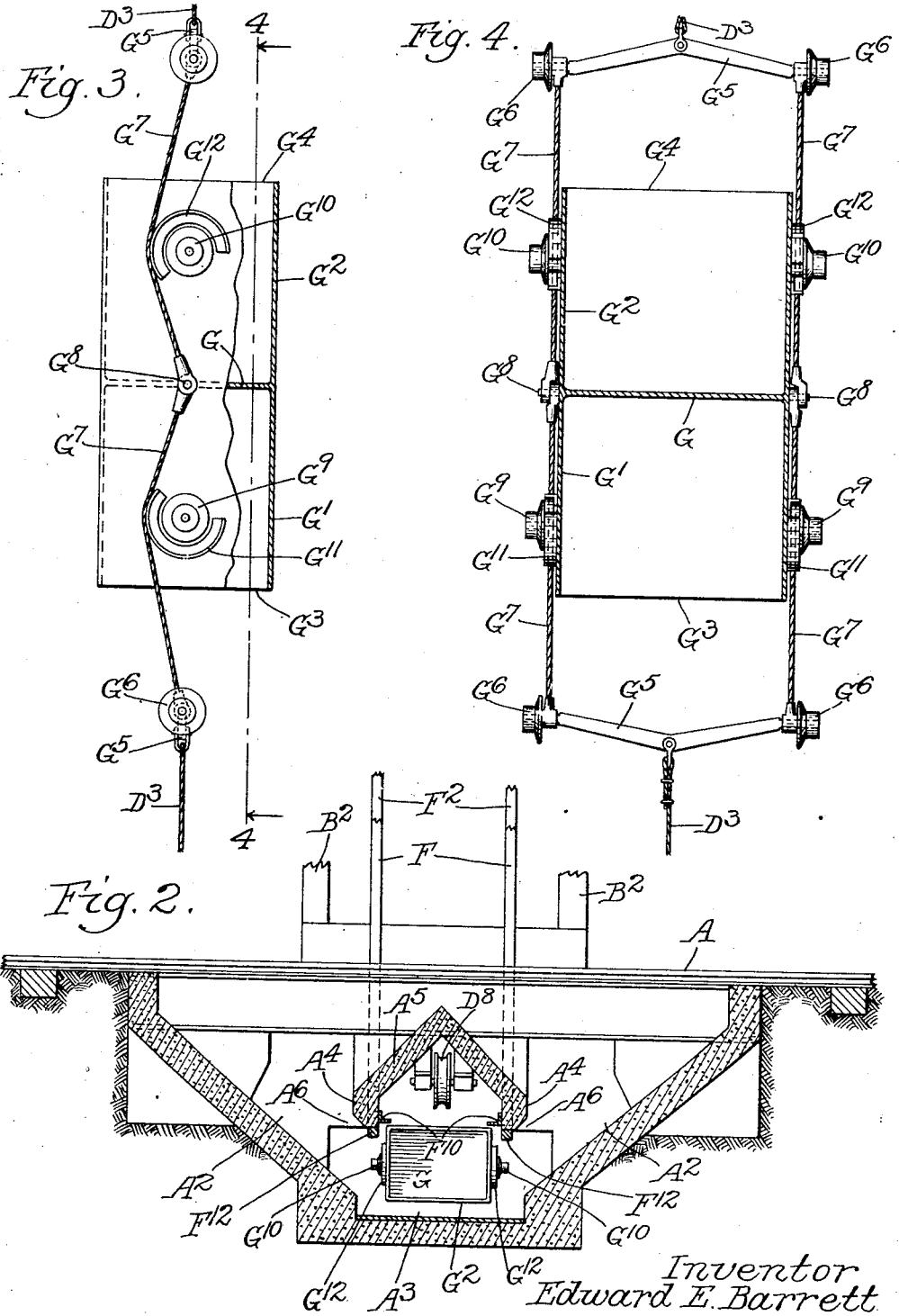

1,723,003

UNITED STATES PATENT OFFICE.

EDWARD E. BARRETT, OF CHICAGO, ILLINOIS, ASSIGNOR TO ROBERTS AND SCHAEFER COMPANY, OF CHICAGO, ILLINOIS, A CORPORATION OF ILLINOIS.

MATERIAL-HANDLING STATION.

Application filed June 11, 1927. Serial No. 198,037.

This invention relates to a coaling station and is herein shown as applied to a coaling station intended for use for coaling locomotives. It has for one object to provide in connection with such a station means for filling the storage bin from a track underlying the bin. Another object is to provide means whereby the coal may be raised to the bin by a track bucket passing beneath the track. Another object is the provision of means for filling said bin by use of a track bucket which dumps into the bin alternately at opposite sides thereof. Other objects will appear from time to time in the course of the specification and claims.

I illustrate my invention more or less diagrammatically in the accompanying drawings, wherein:

Figure 1 is a vertical cross-section of a coaling station;

Figure 2 is a section on the line 2—2 of Figure 1;

Figure 3 is a side elevation of the bucket with parts in section;

Figure 4 is a section on the line 4—4 of Figure 3.

Like parts are indicated by like symbols throughout the specification and drawings.

A is a railroad track adapted to support a car $A^1$ above a receiving hopper $A^2$. The coal from the car is discharged into said track hopper. $A^3$ indicates a loading tunnel formed by the side walls $A^4$ and the inclined roof portion $A^5$. $A^6$ are doors through the walls $A^4$, whereby material may pass from the receiving hopper $A^2$ to the loading tunnel.

B is a storage bin which may have the inclined bottom member or members $B^1$, supported upon any suitable framework $B^2$. It will not be further described, since its details form no part of the present invention.

Leading from the storage bin B is any suitable discharge chute or chutes C, of which there may be any suitable number. By means of these chutes coal is discharged into locomotive tenders or into any other suitable receptacles.

D is a framework above the storage bin B, which may support the roof $D^1$ and any suitable hoisting mechanism not herein shown in detail, as forming no part of the present invention. $D^2$ diagrammatically indicates any suitable hoisting motor adapted to draw in or pay out upon the line $D^3$. $D^4$ are any suitable head sheaves and $D^5$ $D^6$ $D^7$ are pairs of idler sheaves, $D^8$ being a single idler beneath the track level.

Referring to the bucket guiding means, F is an inner track member. In the form of my device herein shown there are two such members, each extending from the storage bin down along one side thereof to the filling hopper, said tracks being shown as continuous, being joined by the arcuate portion $F^1$ which passes through the filling tunnel. $F^2$ are outer track members, shown as terminating adjacent each mouth of the filling tunnel. The tracks F and $F^2$ incline inwardly as at $F^3$, at each side of the storage bin and are deformed thereabove, to provide dumping means for the bucket hereafter to be described. Each track F is provided with a sharply inwardly inclined portion $F^4$ terminating in a bend $F^5$ which is connected by the portion $F^6$ with a terminal portion $F^7$ generally aligned with the track at $F^3$. The tracks $F^2$ are outwardly arched as at $F^8$, as shown in Figure 1. $F^{10}$ is an arcuate track section positioned within the loading tunnel in opposition to the arcuate track $F^1$ which at that point is flattened as at $F^{12}$.

The bucket employed includes a solid or fixed bucket bottom G with bucket walls extending from opposite sides thereof as at $G^1$ $G^2$ to form two identical buckets having open mouths $G^3$ $G^4$ facing in opposite directions. The ends of the hoist line $D^3$ are secured to the rigid cross-yokes $G^5$ which have at their ends guide rollers $G^6$. The cross-yokes $G^5$ are connected to the bucket by cable bails $G^7$ which pivot as at $G^8$ to the sides of the bucket in line with the fixed bottom G. At the sides of the buckets, in the walls $G^1$ and $G^2$, are positioned guide rollers $G^9$ $G^{10}$ and about said rollers are arcuate angle iron guides $G^{11}$ $G^{12}$.

It will be realized that whereas I have described and shown a practical and operative device nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

Coal or other material to be handled, is dumped into the receiving hopper, for example by release from cars spotted on the track. Material passes by gravity from the hopper through the doors into the loading tunnel. The driving mechanism is then set in operation and the cable moves so as to move the bucket through the loading tunnel, in either direction. The bucket having an open mouth at each end, it makes no difference in which direction it passes through the tunnel, and the hoisting mechanism is preferably actuated to move the bucket through the tunnel alternately in opposite directions. Since a duplex bucket is used it is never necessary to reverse its direction. As the bucket passes through the tunnel the cable $D^3$ is guided by the bottom pair of idlers $D^7$. The guide rollers $G^6$ of the cross-yokes $G^5$ are guided along the arcuate track portion $F^1$ and its flattened intermediate portion $F^{12}$. The bucket itself is held against upward movement by the arcuate upper tracks or angles $F^{10}$. As the bucket passes upwardly out of the tunnel and along the vertical portion of the tracks F and $F^2$ the bail rollers $G^6$ and the guide rollers $G^9$ $G^{10}$ on the bucket itself are guided between the tracks F and $F^2$, thus holding the bucket in vertical position. When the bucket reaches the expanded track portion above described, and assuming that the bucket is traveling upwardly in the position shown in Figure 3, the guide roller $G^{10}$ rides outwardly along the track section $F^4$ until it reaches the bend $F^5$, when it can go no further. Further actuation of the hoisting means tilts the bucket into the position shown in Figure 1, its charge being dumped into the storage bin. Upon reversal of the hoisting mechanism the bucket moves downwardly to and through the loading tunnel, passing through it in the opposite direction.

Whereas in my preferred form I employ a bucket with a fixed intermediate bottom member, it will be realized that I do not wish to limit myself specifically to such a bucket or to a fixed bottom in such a bucket, since under some circumstances and in some forms of my device a movable bucket bottom may be employed.

It will be observed that I am able to dispense with any reversal of the direction of the bucket, and, in the form of the fixed bottom, the bucket is free from normally moving parts.

I claim:

1. In a material handling installation, a hoist and dump bucket, a cable therefor and means for actuating it, a bin into which said bucket is adapted to dump, inner and outer guide tracks for said bucket, extending upwardly along said bin, the inner tracks being extended upwardly and inwardly at the dumping point, said upward and inward section terminating in a stop, the outer tracks being formed with an arcuate section generally concentric with said stop, the bucket having associated with it a plurality of guide members, one of said guide members being adapted to ride along said inclined section and to engage said stop.

2. In a material handling installation, a scoop passage, a loading bin in communication with said passage and adapted to deliver material thereto, a duplex hoist bucket and means for drawing it through said passage alternately in opposite directions, guide tracks for said bucket extending upwardly from the opposite ends of said scoop passage, a hoisting line for said bucket passing through said scoop passage, a plurality of bails pivoted to said bucket, a single intermediate fixed bottom member in said bucket, a plurality of track engaging guide members positioned at each side of said bucket, arranged in pairs, one pair adjacent each end of the bucket, and a pair of track engaging guide members positioned on each bail.

3. In a material handling installation, a scoop passage, a loading bin in communication with said passage and adapted to deliver material thereto, a duplex hoist bucket and means for drawing it through said passage alternately in opposite directions, guide tracks for said bucket extending upwardly from the opposite ends of said scoop passage, a hoisting line for said bucket passing through said scoop passage, a plurality of flexible bails pivoted to said bucket, a single intermediate fixed bottom member in said bucket, a plurality of track engaging guide members positioned at each side of said bucket, arranged in pairs, one pair adjacent each end of the bucket, bail engaging projections from the bucket wall positioned adjacent the guide members on the bucket sides, and a pair of track engaging guide members positioned on each bail.

4. In a material handling installation, a hoist and dump bucket, a cable therefor and means for actuating it, a bin into which said bucket is adapted to dump, inner and outer guide tracks for said bucket, extending upwardly along said bin, the inner tracks being extended upwardly and inwardly at the dumping point, said upward and inward section terminating in a stop, the outer tracks being formed with an arcuate section generally concentric with said stop, the bucket having associated with it on two opposite sides a plurality of guide members, one of said guide members being adapted to ride along said inclined section and to engage said stop, the distance between the two guide members on each side being substantially equal to the radius of the arc described by the outer track section.

5. In a material handling installation, a hoist and dump bucket, a cable therefor and means for actuating it, a bin into which said bucket is adapted to dump, parallel inner and outer guide tracks for said bucket, extending upwardly along said bin, the inner tracks being extended upwardly and inwardly at the dumping point, said upward and inward section terminating in a stop, the outer tracks being formed with an arcuate section generally concentric with said stop, the bucket having associated with it a plurality of guide members, one of said guide members being adapted to ride along said inclined section and to engage said stop, the two tracks terminating, beyond the expansion or separation thus formed, in a further parallel section.

6. In a material handling installation, a hoist and dump bucket, a cable therefor and means for actuating it, a bin into which said bucket is adapted to dump, parallel inner and outer guide tracks for said bucket, extending upwardly along said bin, the inner tracks being extended upwardly and inwardly at the dumping point, said upward and inward section terminating in a stop, the outer tracks being formed with an arcuate section generally concentric with said stop, the bucket having associated with it a plurality of guide members, one of said guide members being adapted to ride along said inclined section and to engage said stop, the two tracks terminating, beyond the expansion or separation thus formed, in a further parallel section, and a plurality of handle bails pivoted to said bucket and secured to said cable and track engaging guide members on said handle bails, said handle bails normally extending from said bucket in opposite directions.

7. In a material handling installation, a hoist and dump bucket, a cable therefor and means for actuating it, a bin into which said bucket is adapted to dump, parallel inner and outer guide tracks for said bucket, extending upwardly along said bin, the inner tracks being extended upwardly and inwardly at the dumping point, said upward and inward section terminating in a stop, the outer tracks being formed with an arcuate section generally concentric with said stop, the bucket having associated with it a plurality of guide members, one of said guide members being adapted to ride along said inclined section and to engage said stop, the two tracks terminating, beyond the expansion thus formed, in a further parallel section, a plurality of flexible handle bails pivoted to said bucket and secured to said cable and track engaging guide members on said handle bails, said handle bails normally extending from said bucket in opposite directions, and guard members, surrounding the guide members on said bucket and adapted to engage said flexible bails.

8. For use with a material handling installation which comprises a track, a scoop passage passing transversely beneath said track and provided with openings at each side of said track, and means for delivering material from the track to the scoop passage, a duplex hoist bucket and means for drawing it through said passage alternately in opposite directions, said bucket having material receiving openings at opposite ends thereof and a single intermediate fixed bottom member and bucket walls extending outwardly in opposite directions from the opposite sides of said intermediate fixed bottom, the corresponding walls of the two buckets, at each edge of said fixed bottom, lying in a like plane and forming a single extended side member, the depth of each such bucket being substantially uniform throughout its circumference.

9. For use with a material handling installation which comprises a track, a scoop passage passing transversely beneath said track and provided with openings at each side of said track, and means for delivering material from the track to the scoop passage, a duplex hoist bucket and means for drawing it through said passage alternately in opposite directions, said bucket having material receiving openings at opposite ends thereof and a single intermediate fixed bottom member and bucket walls extending outwardly in opposite directions from the opposite sides of said intermediate fixed bottom, the corresponding walls of the two buckets, at each edge of said fixed bottom, lying in a like plane and forming a single extended side member, and a plurality of bails concentrically pivoted to said bucket, the pivot point of said bails lying in the plane of said fixed bottom member.

Signed at Chicago, county of Cook, and State of Illinois, this third day of June, 1927.

EDWARD E. BARRETT.